United States Patent [19]

Hashimoto

[11] Patent Number: 4,899,229

[45] Date of Patent: Feb. 6, 1990

[54] VIDEO INFORMATION EDITING SYSTEM FOR PROVIDING VIDEO DATA IN A CONTROLLED FORMAT

[75] Inventor: Masashi Hashimoto, Garland, Tex.

[73] Assignee: Texas Instruments Incorporated, Dallas, Tex.

[21] Appl. No.: 158,481

[22] Filed: Feb. 22, 1988

[30] Foreign Application Priority Data

Feb. 2, 1987 [JP] Japan .................................. 62-38631

[51] Int. Cl.⁴ .......................................... G11B 27/02
[52] U.S. Cl. ................................................. 360/141
[58] Field of Search .................. 360/72.1, 13, 14.1, 360/72.2, 69, 137

[56] References Cited

U.S. PATENT DOCUMENTS

| | | | |
|---|---|---|---|
| 3,890,639 | 6/1975 | O'Donnell et al. | 360/14.1 |
| 3,934,268 | 1/1976 | Uemura | 360/72.1 |
| 4,028,733 | 6/1977 | Ulicki | 360/72.2 |
| 4,213,163 | 7/1980 | Lemelson | 360/13 |
| 4,227,220 | 10/1980 | Brown et al. | 360/72.1 |
| 4,538,188 | 8/1985 | Barker et al. | 360/72.2 |
| 4,635,136 | 1/1987 | Ciampa et al. | 360/14.1 |
| 4,685,001 | 8/1987 | Martin | 360/14.1 |
| 4,685,003 | 8/1987 | Westland | 360/14.1 |
| 4,698,664 | 10/1987 | Nichols et al. | 360/14.1 |
| 4,774,600 | 10/1988 | Baumeister | 360/14.1 |

Primary Examiner—Vincent P. Canney
Attorney, Agent, or Firm—William E. Hiller; N. Rhys Merrett; Melvin Sharp

[57] ABSTRACT

A video information editing system has a field memory portion capable of storing predetermined units of digital video information, a peripheral circuit portion to make this field memory portion operate, and a video data writing circuit to rewrite video information from the field memory portion, these being added to a known video information reproducing device in the form of a video tape recorder/playback device. The system is so constructed as to access only specific video information comprising a portion of the complete original video information contained on the recording tape of the video tape recorder/playback device.

15 Claims, 1 Drawing Sheet

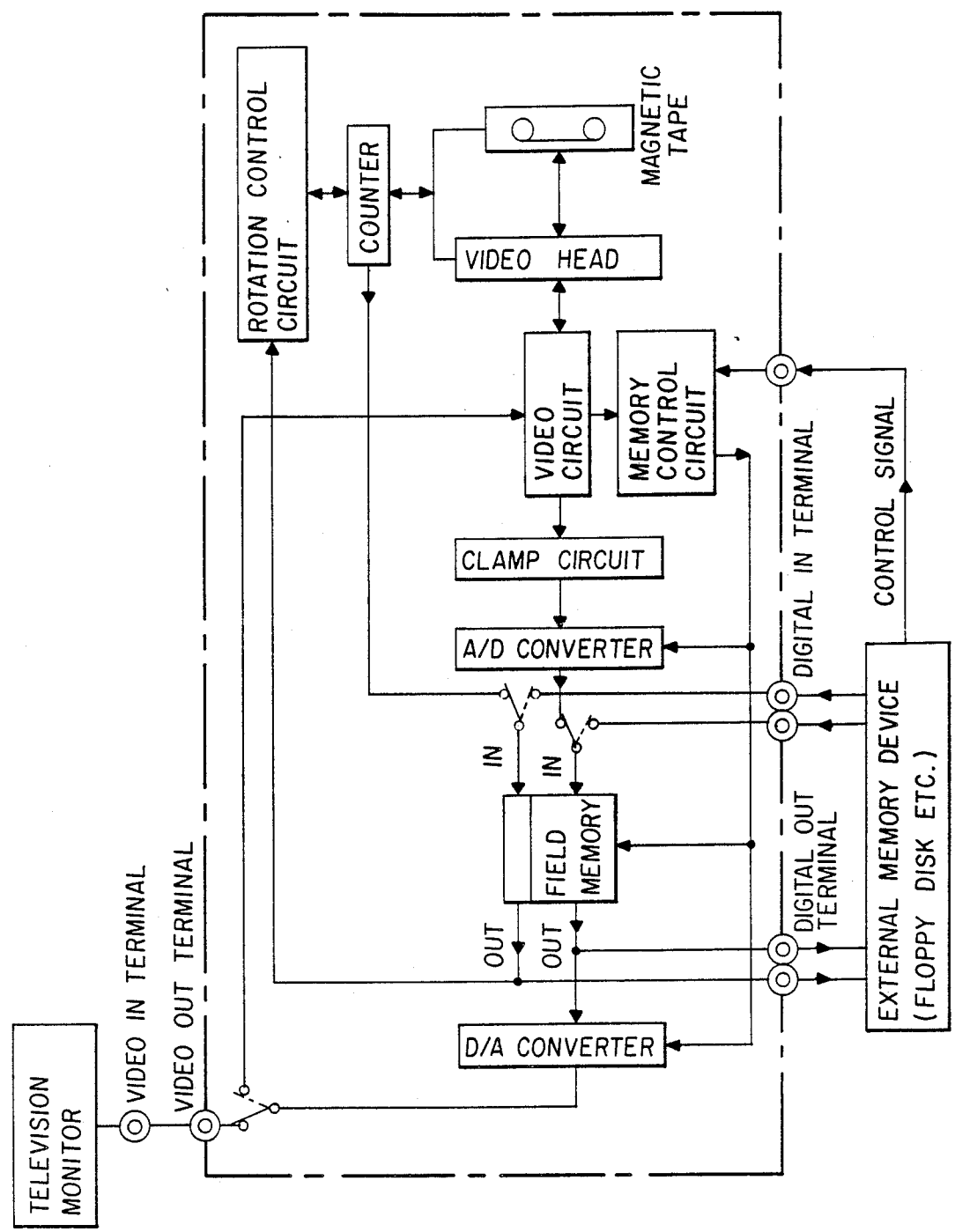

VIDEO INFORMATION EDITING SYSTEM FOR PROVIDING VIDEO DATA IN A CONTROLLED FORMAT

BACKGROUND OF THE INVENTION

1. Field of the Invention

The invention relates to an information editing system, especially to a television video information editing system.

2. Description of the Prior Art

A VTR (video tape recorder) and a television camera have come into wide use and are now beginning to be used as a means of preserving a visual record of the growth of members of a family, in a manner similar to the use of the conventional optical camera.

However, because a VRT is used to record motion or voice continuously, an incident is recorded over a span of time of some length, not being recorded at a single instant of time as in the use of the conventional camera. Therefore, it would ordinarily take some time to reproduce a single frame of recorded information from a VTR. In the latter respect, a magnetic tape is generally used in a VTR as a recording medium in which various incidents are recorded sequentially. Such a magnetic tape can record video information over a period of time ranging from 30 minutes to 6 hours per roll. Accordingly, it not be known what kind of an incident is recorded on which position of a magnetic tape without reproducing a magnetic tape by a television camera. This means that a VRT is not suitable for conveniently accessing and watching various incidents within a short time period as is the case when a photoalbum is reviewed.

OBJECTS AND SUMMARY OF THE INVENTION

An object of the invention is to provide a system for implementing the provision of video data in a controlled format in which the recorded contents of video data produced from the use of a television camera can be known easily in a short time without reproducing all of the recorded video information.

Namely, the invention provides a video information editing system wherein to a basic video information reproducing circuit system are added a field memory portion capable of storing predetermined units of video information, a peripheral circuit portion for controlling the operation of the field memory portion, and a recording medium to rewrite video information from the field memory portion, the video information editing system being so constructed as to take out or access specific video information included among the original video information as recorded on the recording medium.

Other objects, features and advantages of the invention will appear more fully from the following detailed description thereof taken in connection with the accompanying drawings.

BRIEF DESCRIPTION OF THE DRAWING

The single FIGURE is a schematic block diagram of a television video information editing system according to an embodiment of the invention.

DESCRIPTION OF THE PREFERRED EMBODIMENTS

The preferred embodiments of the invention will be explained below.

As shown in the single FIGURE, a video information editing system is provided in which basically to an ordinary VTR are added a field memory capable of storing video information of one frame, a peripheral circuit portion for controlling the operation of the field memory (for example, an A/D converter, a circuit to control operation of a memory, etc.), and an interface means to write information from the field memory again into another recording medium (for example, a floppy disc, a magnetic tape, etc.) external to the VTR, the field memory, and the memory control circuit.

The operation of this editing system will now be explained. First, a magnetic tape in use for a VTR with video information already recorded thereon is reproduced by a VRT. Then, as occasion demands, video information defining one frame of video information is written into the field memory through a video circuit and an A/D converter. The content of video information of the field memory is immediately recorded or stored in an external memory device comprising a floppy disc or a magnetic tape etc. through an interface device. Necessary video pictures (i.e. one frame of video information) can be selectively reproduced or cut out by repeating the recording to the external memory device over the whole extent of the magnetic tape of the VTR. It is possible to use these pictures themselves as indexes, or to attach an index to the start of each tape by writing data from a floppy disc etc. again into the magnetic tape in use for the VTR at the beginning of the tape.

When using the necessary video pictures as the indexes, as shown in the single FIGURE, a frame of video information from the external memory device is input into a D/A converter through the field memory by shifting a switch between the A/D converter and the field memory as shown by broken lines to connect an output of the external memory device to an input of the field memory. The output of the D/A converter is then reproduced on a television monitor. Such an operation is applied to video pictures (cut-out video pictures as indexes) sent sequentially from the external memory device. Therefore, it is possible to view still pictures via the television monitor as indexed in a short time period, similar to the viewing of a slide or a photofilm. Of course, all of the video information would not be necessarily reproduced in this case.

Besides, when cutting out the video pictures as described above, a distance from the beginning of a tape on which video information is recorded at that time corresponding to the location of the frame of video information is determined (generally, a rotation number of a tape reel is used to identify the location of the frame on the tape. Namely, an output of a counter can be recorded or stored in the external memory device through the field memory thereby playing a role like a page number of a book. Therefore, in searching for particular video pictures, a switch between the counter and the field memory is shifted as shown by broken lines to input information for turning to the first address in an address index from the external memory device into a counter rotation control circuit. As a result, the video tape can be set at the corresponding position on which the desired frame of video information is found. Therefore, it is possible to monitor pictures cut off sequentially in respective TV frames of the video monitor as slide films by making the video tape set up at the corresponding positions on the tape. Thus, monitoring of the video pictures can be conveniently performed without delay when a user wants to watch pictures occurring on the tape at positions before or after the picture now being monitored.

Moreover, in the same way as described above, video information of corresponding to plural frames as stored in a floppy disc or other similar storage device serving as the external memory device may be written by a video circuit into the head of the video tape recorder. In this case, each frame of the video information stored in the floppy disc may be rewritten into the field memory. Then, a switch on the side of a television monitor is switched as shown by broken lines, to connect the D/A converter via a feedback line to the video circuit such that signals from the D/A converter are input into the video circuit, and the video circuit outputs signals to the video head of the VTR to be recorded on the tape by the video head. In this case, an index picture can be recorded at the beginning of the tape as if this were a book.

When the video information is stored in an external memory device such as a floppy disc etc. and is read out if necessary, the information should be passed through the field memory. This is because the read-out speed of video information is different between respective media. Accordingly, the speed is converted by the field memory to the appropriate speed rate. Optional pictures recorded in a video tape may be written into the field memory by a suitable known method. Furthermore, video information in the field memory may be rewritten also into the floppy disk etc. and may be reproduced by being passed through the field memory after conversion of the speed by the field memory, thereby providing only necessary video information for viewing on the television monitor without delay.

Moreover, video information written into the field memory is converted to be in digital values which correspond to digital data being processed in a field of an electronic computer. Therefore, the video information of the field memory can be transferred into a recording medium having a relatively large capacity such as a floppy disc or a magnetic tape etc., using a suitable known means. In addition And, as described above, by rewriting the video information of the field memory into the video head of the VTR recording on a video tape which is being currently reproduced, the contents of the field memory can be shown on a frame of a television monitor as a still picture during a desired time. Therefore, video recording can be performed at an optional position on a video tape for an optional length (namely, video recording is may be performed on a video tape repeatedly by for the necessary number of frames), by applying the same method employed in an ordinary video recording of a television picture. Furthermore, when recording video information in digital form on a floppy disc etc., because addresses are established for each bit of video information unlike a video tape, the recording can be controlled, for example, so as to record one or more pictures on a frame.

It will be evident that various modifications can be made to the described embodiments without departing from the scope of the present invention.

For example, in the above embodiment, when reproducing the video information from the recording medium, not less than two still pictures as well as one still picture can be reproduced simultaneously in a television frame, or a socalled picture-in-picture method can be applied. When reproducing plural pictures, a device can be constructed so that the necessary video information is selected by operation of a button. Instead of the above described external memory device, the video tape (magnetic tape) itself shown in the single FIGURE can be used as another recording medium. In this case, for example, a picture can be recorded on a tape in a second, or plural pictures not less than two can be recorded compactly in a second as described above.

In the invention, as mentioned above, because a field memory portion, a peripheral circuit portion and a recording medium are added and only specific information is taken out or accessible from this recording medium, the specific information can be selectively viewed in a video monitor with ease in a short time without reproducing all of the recorded video information.

What is claimed is:

1. A video information editing system for providing the video data produced on a video tape by a video tape recorder/playback device in a controlled format to permit selective viewing of the video data as graphically displayed on a video monitor upon playback thereof, said video information editing system comprising:
   a video tape recorder/playback device including video head means and adapted to contain a video tape;
   field memory means having memory storage for storing at least one frame of video data, said field memory means being operably connected to said video tape recorder/playback device;
   video data write means connected to the output of said video tape recorder/playback device for accepting analog video data from a video tape upon reproduction thereof;
   analog-digital converter means interposed between said video data write means and said field memory means for converting analog video data from the output of said video data write means into digital video data for input to said field memory means;
   memory control means connected between said video data write means and said field memory means for regulating the writing of video data from said video data write means into said field memory means;
   interface means operably connected to said field memory means and to said video tape recorder/playback device, said interface means being adapted to be connected to external memory means to control the writing of digital video data from said field memory means into the external memory means and from the external memory means into said field memory means; and
   digital-analog converter means connected to the output of said field memory means to convert the digital video data output therefrom into analog video data for input to a video monitor for graphic display thereof.

2. A video information editing system as set forth in claim 1, wherein said interface means includes a counter rotation control circuit, and
   counter means connected to said counter rotation control circuit;
   said counter means having an output selectively connectable to an input of said field memory means;

said counter means also being connected to said video tape recorder/playback device to provide indexing information identifying the location of specific frames of video data on a video tape within the video tape recorder/playback device by particular count numbers;

the output of said counter means being selectively input to said field memory means for subsequent transfer to said external memory means for storage; and said counter rotation control circuit being responsive to an output from said field memory means of digital video data for moving said counter means and the video tape in unison therewith to set the video tape at a position corresponding to the desired analog video data frame provided thereon.

3. A video information editing system as set forth in claim 2, wherein said interface means further includes first and second switching means, said first switching means connecting an output of said counter means to an input of said field memory means in a first position and being movable to a second position connecting an output of said external memory means to an input of said field memory means while disconnecting said counter means from said field memory means; and said second switching means connecting the output of said analog-digital converter means to an input of said field memory means in a first position and being movable to a second position connecting an output of said external memory means to an input of said field memory means while disconnecting said analog-digital converter means from said field memory means.

4. A video information editing system as set forth in claim 1, further including a feedback line selectively interconnecting the output of said digital-analog converter means to an input of said video data write means;

said field memory means being adapted to receive successive frames of digital video data from said external memory means as stored therein for output to said digital-analog converter means and input to said video data write means from said digital-analog converter means as analog video data via said feedback line; and said video data write means being bidirectionally connected to said video tape recorder/playback device so as to output analog video data as derived from said digital-analog converter means to said video tape recorder/playback device for recording said analog video data on a video tape within said video tape recorder/playback device.

5. A video information editing system for providing the video data produced on a video tape by a video tape recorder/playback device in a controlled format to permit selective viewing of the video data as graphically displayed on a video monitor upon playback thereof, said video information editing system comprising:

a video tape recorder/playback device including video head means and adapted to contain a video tape;

field memory means having memory storage for storing at least one frame of video data, said field memory means being operably connected to said video tape recorder/playback device;

video data write means connected to the output of said video tape recorder/playback device for accepting analog video data from a video tape upon reproduction thereof;

analog-digital converter means interposed between said video data write means and said field memory means for converting analog video data from the output of said video data write means into digital video data for input to said field memory means;

memory control means connected between said video data write means and said field memory means for regulating the writing of video data from said video data write means into said field memory means;

external memory means operably connected to said field memory means for input of digital video data from said external memory means to said field memory means and output of digital video data from said field memory means to said external memory means;

interface means operably connected to said field memory means, said video tape recorder/playback device, and said external memory means to control the writing of digital video data from said field memory means into said external memory means and from said external memory means into said field memory means; and digital-analog converter means connected to the output of said field memory means to convert the digital video data output therefrom into analog video data for input to a video monitor for display thereof.

6. A video information editing system as set forth in claim 5, wherein said external memory means has an output connected to an input of said memory control means for providing a control signal to actuate said memory control means in regulating video data transfer between said field memory means and said external memory means.

7. A video information editing system as set forth in claim 5, wherein said external memory means comprises a floppy disk.

8. A video information editing system as set forth in claim 5, wherein said external memory means comprises a magnetic tape onto which digital video data may be recorded.

9. A video information editing system as set forth in claim 5, wherein information as to the starting address of a segment of video data is provided by said video tape for transmission to said external memory means and storage therein via said video data write means, said analog-digital converter means, and said field memory means.

10. A video information editing system as set forth in claim 5, further including video monitor means selectively connected to said digital-analog converter means for graphically displaying the analog video data as input thereto from said digital-analog converter means.

11. A video information editing system as set forth in claim 10, further including switching means connecting the output of said digital-analog converter means to an input of said video monitor means in a first position and being movable to a second position connecting said digital-analog converter means to an input of said video data write means while disconnecting said digital-analog converter means from said video monitor means.

12. A video information editing system as set forth in claim 10, wherein said one frame of video data stored in said field memory means is output as digital video data to said digital-analog converter means for subsequent output from said digital-analog converter means as analog video data to said video monitor means for display as a still picture.

13. A video information editing system as set forth in claim 11, wherein said interface means includes a counter rotation control circuit, and counter means connected to said counter rotation control circuit;

said counter means having an output selectively connectable to an input of said field memory means;

said counter means also being connected to said video tape recorder/playback device to provide indexing information identifying the location of specific frames of video data on a video tape within the video tape recorder/playback device by particular count numbers;

the output of said counter means being selectively input to said field memory means for subsequent transfer to said external memory means for storage; and said counter rotation control circuit being responsive to an output from said field memory means of digital video data for moving said counter means and the video tape in unison therewith to set the video tape at a position corresponding to the desired analog video data frame provided thereon.

14. A video information editing system as set forth in claim 13, wherein said interface means further includes first and second switching means, said first switching means connecting an output of said counter means to an input of said field memory means in a first position and being movable to a second position connecting an output of said external memory means to an input of said field memory means while disconnecting said counter means from said field memory means; and said second switching means connecting the output of said analog-digital converter means to an input of said field memory means in a first position and being movable to a second position connecting an output of said external memory means to an input of said field memory means while disconnecting said analog-digital converter means from said field memory means.

15. A video information editing system as set forth in claim 14, further including a feedback line selectively interconnecting the output of said digital-analog converter means to an input of said video data write means;

said field memory means being adapted to receive successive frames of digital video data from said external memory means as stored therein for output to said digital-analog converter means and input to said video data write means from said digital-analog converter means as analog video data via said feedback line; and said video data write means being bidirectionally connected to said video tape recorder/playback device so as to output analog video data as derived from said digital-analog converter means to said video tape recorder/playback device for recording said analog video data on a video tape within said video tape recorder/playback device.

* * * * *